US 8,063,942 B2

(12) United States Patent
Hung et al.

(10) Patent No.: US 8,063,942 B2
(45) Date of Patent: Nov. 22, 2011

(54) MOTION ASSISTED IMAGE SENSOR CONFIGURATION

(75) Inventors: Szepo Robert Hung, Carlsbad, CA (US); Ruben Velarde, San Diego, CA (US); Hsiang-Tsun Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 11/875,652

(22) Filed: Oct. 19, 2007

(65) Prior Publication Data

US 2009/0102935 A1    Apr. 23, 2009

(51) Int. Cl.
*H04N 5/228* (2006.01)
(52) U.S. Cl. ................. 348/222.1; 348/229.1; 348/230.1
(58) Field of Classification Search ............... 348/222.1, 348/229.1, 230.1, 207.99–376
See application file for complete search history.

(56) References Cited

U.S. PATENT DOCUMENTS

| | | | |
|---|---|---|---|
| 5,956,436 A * | 9/1999 | Chien | 382/312 |
| 6,690,424 B1 * | 2/2004 | Hanagata et al. | 348/364 |
| 6,791,527 B2 * | 9/2004 | Yoshinaga et al. | 345/102 |
| 6,882,363 B1 * | 4/2005 | Oda et al. | 348/226.1 |
| 7,546,026 B2 * | 6/2009 | Pertsel et al. | 396/52 |
| 7,570,309 B2 * | 8/2009 | Zhou et al. | 348/701 |
| 7,623,152 B1 * | 11/2009 | Kaplinsky | 348/208.16 |
| 7,643,069 B2 * | 1/2010 | Jun | 348/229.1 |
| 7,738,723 B2 * | 6/2010 | Ehrlich et al. | 382/254 |
| 2002/0154829 A1 * | 10/2002 | Tsukioka | 382/254 |
| 2003/0030728 A1 * | 2/2003 | Kudo | 348/208.6 |
| 2003/0174772 A1 * | 9/2003 | Voronov et al. | 375/240.06 |
| 2004/0047419 A1 | 3/2004 | Wakabayashi et al. | |
| 2005/0046708 A1 * | 3/2005 | Lim et al. | 348/231.6 |
| 2005/0128343 A1 * | 6/2005 | Murata et al. | 348/362 |
| 2006/0001748 A1 * | 1/2006 | Kamon et al. | 348/234 |
| 2006/0072044 A1 * | 4/2006 | Kawamura et al. | 348/797 |
| 2007/0092244 A1 | 4/2007 | Pertsel et al. | |

(Continued)

FOREIGN PATENT DOCUMENTS

WO    WO 98/34400    *    8/1998

OTHER PUBLICATIONS

MPEG-2 "Conformance Extensions for Digital Storage Media Command" (Jul. 1999).

(Continued)

*Primary Examiner* — Tuan Ho
*Assistant Examiner* — Kent Wang
(74) *Attorney, Agent, or Firm* — Todd E. Marlette; James R. Gambale, Jr.

(57) ABSTRACT

In general this disclosure describes techniques for configuring an image sensor of an image capture device based on motion within the scene of interest. In particular, the image capture device analyzes motion between two or more images of the same scene of interest and adjusts the configuration parameters, e.g., gain and/or exposure time, of the image sensor based on the amount of motion within the scene of interest. For example, the image capture device may configure the image sensor with a large gain and a short exposure time when the scene includes a relatively large amount of motion, thus reducing the blur caused by the large amount of motion. Conversely, the image capture device may configure the image sensor with a small gain and a long exposure time when the scene includes relatively little or no motion, thus reducing the noise caused by large gains.

35 Claims, 5 Drawing Sheets

U.S. PATENT DOCUMENTS

| | | | |
|---|---|---|---|
| 2007/0160128 A1* | 7/2007 | Tian et al. ............... | 375/240 |
| 2007/0165960 A1* | 7/2007 | Yamada .................. | 382/254 |
| 2007/0216777 A1* | 9/2007 | Quan et al. ............. | 348/222.1 |
| 2007/0285527 A1* | 12/2007 | Kusayama et al. ..... | 348/222.1 |

OTHER PUBLICATIONS

ITU-T H.263, "Series H: Audiovisual and Multimedia Systems Infrastructure of audiovisual services-Coding of moving video, Video coding for low bit rate communication", (Jan. 2005).

ITU-T H.264, "Series H: Audiovisual and Multimedia Systems Infrastructure of audiovisual services-Coding of moving video, Advanced video coding for generic audiovisual services", (Mar. 2005).

IEEE Wireless LAN Edition, 802.11-1999 (R2003).

Ken Sauer, et al., "Efficient Block Motion Estimation Using Integral Projections", IEEE Transactions on Circuits and Systems for Video Technology, New Jersey, vol. 6, No. 5, Oct. 1, 1996.

Maravall, et al., "Mobile Detections Based on Histogram Difference", Lecture notes in Computer Science—Computer Analysis of Images and Patterns, vol. 970, Jan. 1, 1995, pp. 286-293.

International Search Report and Written Opinion—PCT/US2008/080346, International Search Authority—European Patent Office—Mar. 20, 2009.

* cited by examiner

MOTION ASSISTED IMAGE SENSOR CONFIGURATION

TECHNICAL FIELD

The disclosure relates to capturing digital images and, more particularly, techniques for adjusting configuration parameters of an image sensor.

BACKGROUND

Digital image capture devices, such as digital still image cameras, use an image sensor to capture an image of a scene of interest. The image capture device may include a number of image sensor configuration parameters that may be adjusted to better capture images in different environmental conditions. For example, the image capture device may include a number of sensitivity settings, often referred to as ISO settings, that may each correspond to a particular gain for the image sensor and/or an exposure time during which the image sensor is exposed to the scene of interest. Higher ISO settings represent greater image sensor sensitivity, and correspond to larger gains and shorter exposure times. Conversely, lower ISO settings represent lower image sensor sensitivity, and correspond with smaller gains and longer exposure times.

Typically, image capture devices allow a user to manually select image sensor configuration parameters, e.g., the ISO settings, for use in capturing images. By manually selecting the ISO settings, the user can select the ISO setting appropriate for the current environmental condition to better capture images in that environment. Alternatively, or additionally, image captures devices may include automatic configuration setting functions that select the sensor configuration parameters, e.g., ISO, based on the amount of light available in the current environmental condition. The image capture devices may, for example, include light sensors that detect the brightness of the surrounding environment and select the configuration setting based on the amount of light detected.

SUMMARY

An image capture device may adjust one or more configuration parameters of an image sensor based on the brightness of a scene of interest. In a dark environment, for example, the image capture device may select a larger gain for an image sensor to increase the sensitivity of the image sensor and a shorter exposure time during which the image sensor is exposed to the scene of interest. Conversely, in a bright environment, the image capture device may select a smaller gain for the image sensor to decrease the sensitivity of the image sensor and a longer exposure time during which the image sensor is exposed to the scene of interest. Selecting the configuration parameters of the image sensor based on the brightness of the scene of interest does not, however, always result in the best image quality. For example, if the scene of interest is in a bright environment but includes a lot of motion, the captured image may be blurred as a result of the long exposure time.

This disclosure describes techniques for selecting configuration parameters for an image sensor based on detection of motion within the scene of interest. As will be described in detail below, the image capture device analyzes changes between two or more images of the same scene of interest that are indicative of motion within the scene. The image capture device adjusts the configuration parameters, e.g., gain and/or exposure time, of the image sensor based on the amount of motion within the scene of interest. For example, the image capture device may configure the image sensor with a large gain and a short exposure time when the scene includes a relatively large amount of motion, thus reducing the blur caused by the large amount of motion. Conversely, the image capture device may configure the image sensor with a small gain and a long exposure time when the scene includes relatively little or no motion, thus reducing the noise caused by high gain.

In one aspect, a method for capturing digital image data comprises analyzing motion between at least a first image of a scene of interest and a second image of the scene of interest and adjusting one or more configuration parameters used by an image sensor to capture images based on the analysis.

In another aspect, a device for capturing digital image data comprises an image sensor to capture images in accordance with one or more configuration parameters and an image processor that analyzes motion between at least a first image of a scene of interest and a second image of the scene of interest and adjusts one or more of the configuration parameters used by the image sensor to capture images based on the analysis.

In another aspect, a computer-program product for capturing digital image data comprises a computer readable medium having instructions thereon. The instructions comprises code for analyzing motion between at least a first image of a scene of interest and a second image of the scene of interest and code for adjusting one or more configuration parameters used by an image sensor to capture images based on the analysis.

In another aspect, an apparatus for capturing digital image data comprises means for analyzing motion between at least a first image of a scene of interest and a second image of the scene of interest and means for adjusting one or more configuration parameters used by an image sensor to capture images based on the analysis.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA, also known as field programmable logic arrays, FPLA), or digital signal processor (DSP), or other equivalent integrated or discrete logic circuitry, or a combination thereof. The software that executes the techniques may be initially stored in a computer-readable medium and loaded and executed by a processor. Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more examples are set forth in the accompanying drawings and the description below. Other features, objects, and advantages will be apparent from the description and drawings, and from the claims.

DETAILED DESCRIPTION

An image capture device may adjust one or more configuration parameters of an image sensor based on the brightness of a scene of interest. In a dark environment, for example, the image capture device may select a larger gain for an image sensor to increase the sensitivity of the image sensor and a shorter exposure time during which the image sensor is exposed to the scene of interest. Conversely, in a bright environment, the image capture device may select a smaller gain for the image sensor to decrease the sensitivity of the image sensor and a longer exposure time during which the image sensor is exposed to the scene of interest. Selecting the configuration parameters of the image sensor based on the brightness of the scene of interest does not, however, always result in the best image quality. For example, if the scene of interest is in a bright environment but includes a lot of motion the captured image may be blurred as a result of the long exposure time.

This disclosure describes techniques for selecting configuration parameters for an image sensor based on motion within the scene of interest. To detect the amount of motion within the scene of interest, the image capture device may analyze changes between two or more images of the same scene of interest. In one example, the image capture device may analyze the amount of motion between the two images by analyzing a plurality of motion vectors. The image capture device may analyze a number of other indicators of motion between the images, including differences in brightness between two images, differences 1-dimensional projection values between two images, differences in histograms of the two images, and the like.

The image capture device adjusts the configuration parameters of the image sensor based on the amount of motion within the scene of interest. One such configuration parameter that can be adjusted is a gain of the image sensor. The image sensor gain corresponds with an increase in magnitude of the captured signal. In some cases, the gain may represent the ratio between output signal and measured property. Another such configuration parameter that can be adjusted is an exposure time. The exposure time is the period of time during which the image sensor is exposed to the scene of interest. For example, the image capture device may configure the image sensor with a large gain and a short exposure time when the scene includes a relatively large amount of motion, thus reducing the blur caused by the large amount of motion. Conversely, the image capture device may configure the image sensor with a small gain and a long exposure time when the scene includes relatively little or no motion, thus reducing the noise caused by high gain.

Figure 1:
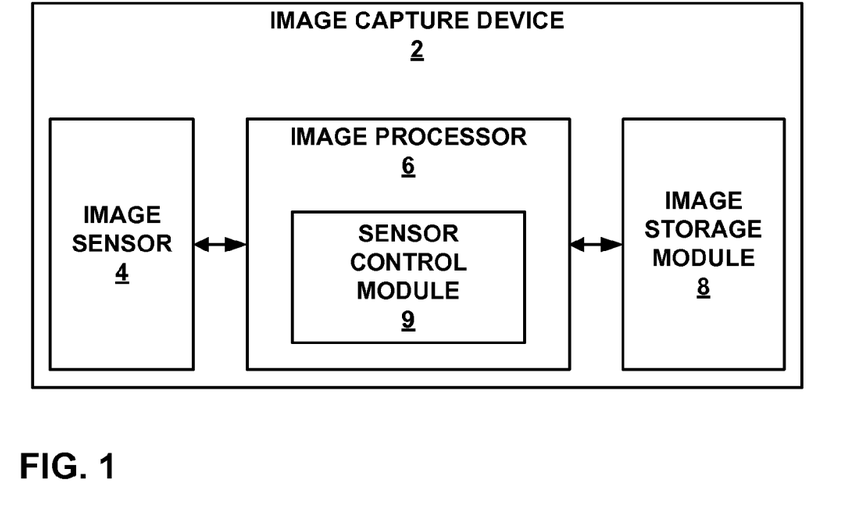
FIG. 1 is a block diagram illustrating an example image capture device that implements the image sensor configuration techniques described in this disclosure.

FIG. 1 is a block diagram of an example image capture device 2 that implements image sensor configuration techniques described in this disclosure. Image capture device 2 may be a digital camera, such as a digital still image camera, a digital video camera or a combination of both. In addition, image capture device 2 may be a stand-alone device, such as a stand-alone camera, or be integrated in another device, such as within a wireless communication device. As an example, image capture device 2 may be integrated in a mobile telephone to form a so-called "camera phone" or "video phone." Although the image sensor configuration techniques described in this disclosure may be generally applicable to captured digital video, application of such techniques to digital still images will be described for purposes of illustration.

As shown in FIG. 1, image capture device 2 includes an image sensor 4, an image processor 6 and an image storage module 8. Image sensor 4 acquires an image of a scene of interest. For example, image sensor 4 may capture still images, or possibly full motion video sequences, in which case image processing may be performed on one or more image frames of the video sequence. Captured video may include video captured for archival or video telephony or other applications. Image sensor 4 may include a two-dimensional array of individual image sensor elements, e.g., arranged in rows and columns. In some aspects, each of the image sensor elements of image sensor 4 may be associated with a single pixel. In other words, there may be a one-to-one correspondence between image sensor elements and pixels. Alternatively, there may be more than one image sensor element associated with each pixel or more than one pixel associated with each image sensor element. Image sensor 4 may comprise, for example, an array of solid state sensors such as complementary metal-oxide semiconductor (CMOS) sensors, charge coupled device (CCD) sensors or the like.

Image sensor 4 exposes the image sensor elements to the image scene to capture the image. The image sensor elements within image sensor 4 may, for example, capture intensity values representing the intensity of the light of the scene at a particular pixel position. In some cases, each of the image sensor elements of sensor 4 may only be sensitive to one color, or color band, due to color filters covering the sensor elements. For example, image sensor 4 may comprise image sensor elements covered by an array of red, green and blue (RGB) filters. Image sensor 4 may utilize other color filters, however, such as cyan, magenta, yellow and black (CMYK) color filters. Thus, each of the image sensor elements of image sensor 4 may capture intensity values for only one color.

Image sensor 4 exposes the image sensor elements to the image scene in accordance with one or more image sensor configuration parameters. Some of the image sensor configuration parameters may be adjusted based on one or more characteristics of the scene of interest. Such configuration parameters include a gain of image sensor 4, an exposure time during which image sensor 4 is exposed to the scene of interest, and the like. As will be described in detail below, image capture device 2 may adjust one or more of the image sensor configuration parameters based on the amount of motion within the scene of interest.

Using image sensor gain as an example, image capture device 2 may increase the gain of image sensor 4 when the scene of interest is in a darker environment (e.g., indoors) or includes a relatively large amount of motion within the scene of interest. Increasing the gain allows the image sensor elements to capture the moving scene of interest with a faster shutter speed (shorter exposure time), thereby reducing blur caused by the motion. In particular, larger gain allows the image sensor elements to capture less light by amplifying the output of the image sensor elements. Image capture device 2 may reduce the gain of image sensor 4 or keep the gain small in situations in which there is lots of light or relatively little motion within the scene of interest. In this case, large gain is not necessary because the sensor elements are exposed to the scene of interest for a longer period of time, thereby collecting more light. When image sensor 4 has a large gain, i.e., is very sensitive to light, image sensor 4 may be exposed to the scene of interest for a shorter period of time than if image sensor 4 has a small gain. The amount of time during which image sensor 4 is exposed to the scene of interest is referred to in this disclosure as the exposure time. As such, the larger the gain of image sensor 4, the shorter is the exposure time of sensor 4 to the scene of interest. Conversely, the smaller the gain of image sensor 4, the longer is the exposure time of image sensor 4 to the scene of interest. The exposure time may be controlled, for example, by controlling a mechanical shutter speed of image capture device 2.

Image capture device 2 may include a number of camera operating modes that may be selected by a user. The different camera operating modes may correspond to different camera settings and, in particular, different image sensor configuration settings. For example, image capture device 2 may have a "sport mode" that the user may select when capturing an image with a large amount of motion within the scene of interest. The sport mode may correspond to a high sensor gain and a shorter exposure time. As another example, image capture device 2 may have a "landscape mode" that the user may select when capturing an image with no or relatively little motion within the scene of interest. The landscape mode may correspond with a low gain and a longer exposure time. A number of other modes may also be included with varying gains and exposure times than the sport mode and the landscape mode. In this manner, the user of image capture device 2 may manually select configuration parameters for operating image sensor 4 using the various operating modes.

Additionally, image capture device 2 may include an "auto mode" in which image capture device 2 automatically selects image sensor configuration parameters of image sensor 4. In accordance with the techniques described in detail below, image processor 6 includes a sensor control module 9 that determines the amount of motion in the scene of interest and automatically selects the image sensor configuration parameters for image sensor 4 based on the determination. In one aspect, sensor control module 9 analyzes motion vectors between two or more images of the scene of interest to determine the amount of motion in the scene of interest. For example, sensor control module 9 may determine a magnitude of a subset of the motion vectors of the image and adjust one or more configuration parameters of image sensor 4 based on the magnitude. For scenes of interest with a large amount of motion, sensor control module 9 may select sensitivity settings with shorter exposure times and larger gains. Conversely, sensor control module 9 may select sensitivity settings with longer exposure times and smaller gains for scenes that include relatively little or no motion. Sensor control module 9 may determine the amount of motion with the scene of interest using any of a number of other indicators, such as differences in luminance (herein, "luma") values between two or more images of the scene of interest, differences between 1-dimensional projection values of two or more images of the scene of interest, differences between histograms of two or more images of the scene of interest or the like.

Image processor 6 may also process the image information, e.g., perform image stabilization, cropping, compression, enhancement and the like. Image processor 6 may be realized by one or more microprocessors, microcontrollers, DSPs, ASICs, FPGAs, or any other equivalent discrete or integrated logic circuitry, or a combination thereof. In some aspects, image processor 6 may form part of a CODEC that encodes the image information according to a particular encoding technique or format, such as Motion Pictures Expert Group (MPEG)-2, MPEG-4, MPEG Advanced Video Coding (AVC), part 10, International Telecommunication Union (ITU) H.263, ITU H.264, Joint Photographic Experts Group (JPEG), Graphics Interchange Format (GIF), Tagged Image File Format (TIFF) or the like.

Image processor 6 may store the captured image in image storage module 8 in raw form, e.g., as raw pixel values. Alternatively, image processor 6 may perform additional processing on the captured image and store the processed image in image storage module 8. If the captured image is accompanied by audio information, the audio also may be stored in image storage module 8, either independently or in conjunction with the image. Image storage module 8 may comprise any volatile or non-volatile memory or storage device, such as read-only memory (ROM), electrically erasable programmable read-only memory (EEPROM), or FLASH memory, or such as a magnetic data storage device or optical data storage device.

A number of other elements may also be included in image capture device 2, but are not specifically illustrated in FIG. 1 for simplicity and ease of illustration. For example, image capture device 2 may include additional components for capturing images, such as a lens, a shutter, a flash device and a display. The architecture illustrated in FIG. 1 is merely exemplary, as the techniques described in this disclosure may be implemented with a variety of other architectures. Moreover, the features illustrated in FIG. 1 may be realized by any suitable combination of hardware and/or software components.

Figure 2:
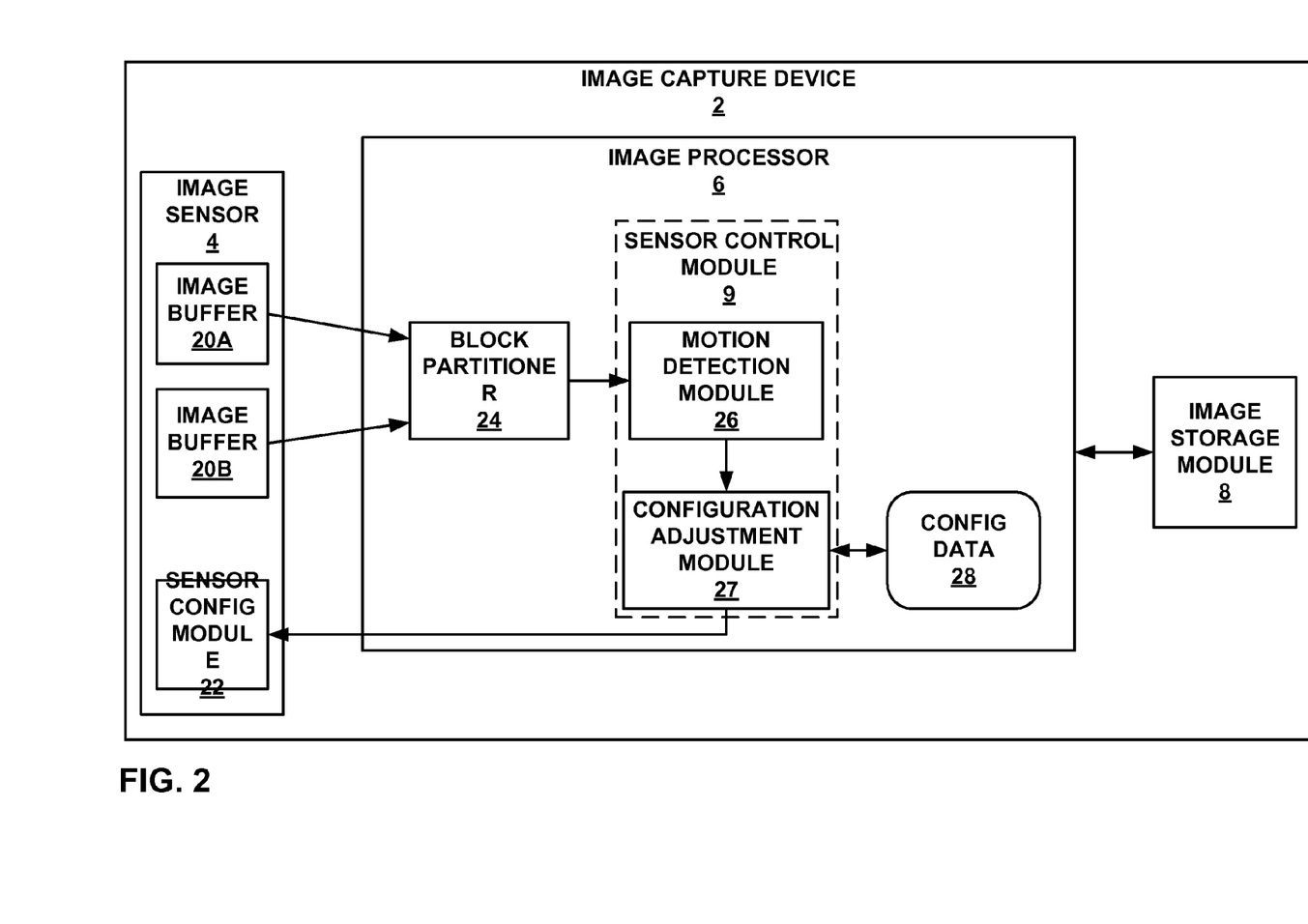
FIG. 2 is a block diagram illustrating the image capture device of FIG. 1 in further detail.

FIG. 2 is a block diagram illustrating image capture device 2 of FIG. 1 in further detail. As illustrated in FIG. 2, image sensor 4 includes image buffers 20A and 20B (hereinafter "image buffers 20") both of which may store image information, e.g., pixel values, pertaining to a captured image of a scene of interest. Image sensor 4 may, for example, store the image information in image buffers 20 during an image preview. More specifically, image sensor 4 may store the images in image buffers 20 while the user is pointing image capture device 2 at the scene of interest, but before the user actuates a button to capture the image. In some aspects, image sensor 4 may capture and store the images in image buffers 20 within seconds if not milliseconds, or even shorter time periods, of one another. In this case, image sensor 4 stores successive sets of image information pertaining to the same scene of interest in image buffers 20. This successive image buffering technique may occur unnoticed by a user attempting to capture the image. That is, from the user's perspective, only a single image is captured via actuation of a button of image capture device 2. Although FIG. 2 includes two image buffers 20, image capture device 2 may include more than two image buffers 20. In this manner, the sensitivity configuration techniques described in this disclosure may, by extension, be applied to more than two images.

Buffers 20 may comprise any volatile or non-volatile memory or storage device, such as ROM, EEPROM, or FLASH memory, or such as a magnetic data storage device or optical data storage device. While shown in FIG. 2 as residing within image sensor 4, buffers 20 may reside external to image sensor 4, such as within other modules of image capture device 2, including image processor 6 or image storage module 8.

Image sensor 4 also includes an image sensor configuration module 22 that configures image sensor 4 in accordance with configuration parameters received from image processor 6. The configuration parameters received from image processor 6 may include a sensor gain, an exposure time or a combination thereof. Image sensor 4 exposes image sensor elements to the scene of interest in accordance with the configuration parameters to capture the image. In particular, based on the configuration parameters, image sensor 4 may increase or decrease a sensor gain of sensor elements of image sensor 4. The adjusting of the sensor gain may correspond in a change in the expose time of image sensor elements. For example, image sensor 4 may expose the image sensor elements for a longer period of time when the image sensitivity is decreased and expose the image sensor elements for a shorter period of time when the image sensitivity is increased. As described above, the adjusted exposure time may be controlled by adjusting a shutter speed of a shutter of image capture device 2.

Image processor 6 includes a block partitioner 24, a sensor control module 9 that includes a motion detection module 26 and a configuration adjustment module 27, and configuration data 28. Depiction of different features as units or modules is intended to highlight different functional aspects of image processor 6, and does not necessarily imply that such units or modules must be realized by separate hardware, software and/or firmware components. Rather, functionality associated with one or more units or modules may be integrated within common hardware, software components and/or firmware components.

As described above, image sensor 4 captures at least two images and stores the images in buffers 20. Image processor 6 receives the images from buffers 20 and may employ block partitioner 24 to partition at least one of the images into a plurality of blocks of pixels (referred to in this disclosure as "blocks"). These blocks, sometimes referred to as macroblocks, represent a contiguous portion of the image information captured by image sensor 4. In the case of the JPEG standard, for example, block partitioner 24 may partition each of the images into 8×8 blocks that include eight rows of pixels and eight columns of pixels. Blocks of larger or smaller than eight rows or columns are also possible. For example, block partitioner 24 may partition each of the images into 16×16 blocks. Moreover, block partitioner 24 may further sub-partition each block into two or more sub-blocks. As an example, a 16×16 block may comprise four 8×8 sub-blocks, eight 4×8 sub-blocks or other sub-partition blocks. As used herein, the term "block" may refer to either any size block or sub-block. In some aspects, however, the images in buffers 20 may not be partitioned into blocks in which case the images may bypass block partitioner 24 and be analyzed directly by motion detection module 26.

Motion detection module 26 determines the amount of motion within the scene of interest. More specifically, motion detection module 26 generates one or more indicators that identify changes between the images of the same scene of interest that are indicative of motion. In one aspect, motion detection module 26 computes motion vectors for each of the blocks of the at least one image. The motion vectors of the blocks represent the displacement of the identified block between the first image and the second image. The motion vector may be denoted as:

$$v(b)=(dx,dy), \qquad (1)$$

where v(b) is the motion vector for block b, dx is the displacement in the x-direction between the block b and the corresponding block in the second image and dy is the displacement in the y-direction between the block b and the corresponding block in the second image. Motion detection module 26 may compute the motion vectors using any of a variety of motion estimation techniques. Motion detection module 26 may, for each block of the first image, search the second image for a block that is a best match to the respective block of the first image. Motion detection module 26 may compare the pixel values of the blocks of the first image with the pixel values of the blocks in the second image using an error measure, e.g., sum of absolute difference (SAD), mean square error (MSE) or the like. Scene change indication module 26 may select the block with the smallest error measurement and compute the displacement between the two blocks to generate the motion vector.

In some cases, motion detection module 26 may select a subset of the motion vectors to determine the amount of motion between the images. Other percentages may be used instead. Motion detection module 26 may, for example, analyze magnitudes of the subset of the largest motion vectors to determine the amount of motion within the scene of interest. Motion detection module 26 may analyze the largest 5%, 10%, or 20% of the motion vectors of the blocks to make the determination. These percentages are provided for purposes of illustration and should not be limiting of the techniques described in this disclosure. The magnitudes of the motion vectors may be computed using the following equation:

$$|v(b)|=\mathrm{sqrt}(dx*dx+dy*dy) \qquad (2)$$

where |v(b)| is the magnitude of the motion vector of block b, sqrt(z) is the square root of z, dx is the displacement in the x-direction between the block b and the corresponding block in the second image and dy is the displacement in the y-direction between the block b and the corresponding block in the second image. Blocks with motion vectors that have large magnitudes may be indicative of a moving object within that block. Alternatively, magnitudes of motion vectors for all the blocks of the image may be analyzed to determine the amount of motion within the entire scene.

Motion detection module 26 may generate other indicators of motion within the scene of interest. In another aspect, motion detection module 26 may detect motion using differences in contrast between the two or more images of the same scene of interest. For example, motion detection module 26 may compute an average luma value for each of the blocks of pixels of both of the images. Motion detection module 26 may then compute the difference between the average luma values of the two images on a block by block basis. In other words, the difference may be computed between a block of the first image and a block of the second image located in the same position as the block of the first image. Motion detection module 26 may identify the block with the largest luma difference and use that luma difference as the indicator of the amount of motion within the scene of interest. A large luma difference for a block may represent object motion within the scene of interest. Alternatively, motion detection module 26 may average the luma differences for a subset or all of the blocks. In this manner, the average luma difference may indicate an amount of global motion throughout the entire scene of interest. This may be particularly useful in detecting motion caused by the camera moving relative to the scene of interest.

In another aspect, motion detection module 26 may generate 1-dimensional projection values for one or more of the blocks of pixels and compare the projections of the two images to detect motion within the scene of interest. In particular, motion detection module 26 may compute horizontal projections, vertical projections or both for each of the blocks of pixels. Horizontal projections are summations of the pixel values of a row of pixels of a block. Vertical projections are summations of the pixel values of a column of pixels of a block. For example, motion detection module 26 may determine, for each of the blocks of each image, horizontal and vertical projections according to the following equations:

$$P_H(j) = \sum_i \text{Im}(i, j), \quad (1)$$

$$P_V(i) = \sum_j \text{Im}(i, j) \quad (2)$$

where $P_H(j)$ denotes the horizontal projection as a function of pixels "j" along the y-axis, $P_V(i)$ denotes the vertical projection as a function of pixels "i" along the x-axis, and Im(i, j) denotes the pixel values as a function of the pixels "i" and "j." $P_H$ therefore is the summation (Σ) of the x-axis pixel values (as i varies and j remains static) of pixel values of the particular block. In this manner, motion detection module 26 generates a single-dimensional horizontal projection vector from two-dimensional image information of the block. In the case of 8×8 blocks of pixels, motion detection module 26 may generate a one-dimensional, eight element horizontal projection vector that represents the two-dimensional 8×8 block. Likewise, $P_V$ is the summation (Σ) of the y-axis pixel values (as i remains static and j varies) of pixel values of the block, i.e., Im(i, j), to form a single-dimensional vertical projection vector from two-dimensional image information of the same block for which the horizontal projection was determined. Each block undergoes the same procedure until every block has been reduced to a series of horizontal and vertical projections.

Motion detection module 26 may then compute a difference between the horizontal and/or vertical projections of each of the blocks of pixels of the images. Motion detection module 26 may identify the block or blocks with the largest projection difference and use that projection difference as the indicator of the amount of motion within the scene of interest. In this manner, the selected projection difference may be an indicator of a moving object within the scene of interest. Alternatively, motion detection module 26 may average the projection differences for a subset or all of the blocks of the images. In this manner, the average projection difference may indicate an amount of global motion of the scene of interest.

In another aspect, motion detection module 26 may compute histograms for each of the images and compute a difference between the histograms as the indicator of the amount of motion within the scene of interest. For example, motion detection module 26 may generate, for each of the images, a histogram that represents the distribution of pixel values over the particular image. Motion detection module may compute a difference between the histograms of the two or more images as an indicator of motion of the scene of interest. Large differences in histograms may indicate large amounts of motion within the scene of interest.

In another aspect, motion detection module 26 may compute a difference between the pixel values of at least a portion of the pixels of each of the images as an indication of motion within the scene of interest. For example, motion detection module 26 may compute a difference between the pixel values of each of the pixel positions of the images, and sum the differences to generate an indicator of motion within the scene. Larger sum of differences may indicate larger amounts of motion within the scene. Alternatively, motion detection module 26 may compute sum of difference indicators on a block by block basis. In other words, motion detection module 26 may compute differences between pixel values of each of the blocks and sum the differences of the pixel value within the blocks to get image block difference to determine motion of objects within the scene.

Configuration adjustment module 27 analyzes the one or more indicators generated by motion detection module 26, and adjusts one or more configuration parameters of image sensor 4 based on the amount of motion detected between the two images. Although discussed herein as adjusting a gain and/or exposure times of image sensor 4 for purposes of illustration, configuration adjustment module 27 may adjust other configuration parameters of image sensor 4. In general, configuration adjustment module 27 may increase the gain of image sensor 4 for scenes that include a relatively large amount of motion, e.g., large motion vectors, large sum of differences, large luma differences, large histogram differences, large 1-dimensional projection differences or the like. Increasing the gain of image sensor 4 may correspond with image sensor 4 being exposed to the scene of interest for a shorter period of time, thus reducing blur in scenes with lots of motion at the expense of increased noise. Conversely, configuration adjustment module 27 may decrease the gain of image sensor 4 for scenes that include relatively small amount of change or no motion at all within the scene of interest. Decreasing the gain of image sensor 4 may correspond with image sensor 4 being exposed to the scene of interest for a longer period of time, thereby reducing noise at the expense of increased blur.

For an image capture device with sensitivity settings of ISO 50, ISO 100 and ISO 200, for example, configuration adjustment module 27 may select the ISO setting as described below. An ISO setting may, for example, correspond with a particular gain and exposure time pair. ISO 50 may correspond with a smallest gain and longest exposure time while ISO 200 may correspond to a largest gain and shortest exposure time. Configuration adjustment module 27 may select ISO 50 when an average motion vector magnitude, e.g., of the largest motion vectors, is less than approximately 1% of a width of the image. For an image with a width of 1000 pixels, for example, sensor control module 9 may select ISO 50 when the magnitude of the motion vectors is less than 10. Configuration adjustment module 27 may select ISO 100 when the average motion vector magnitude is between approximately 1% and 10% of the width of the image. Configuration adjustment module 27 may select ISO 200 when the average motion vector magnitude is between approximately 10% and 20% of the width of the image. Other thresholds may be used to associate the magnitude of the motion vector with particular sensitivity settings. Moreover, additional sensitivity settings may be included in between the settings, e.g., between ISO 50 and ISO 100, or above or below the settings, e.g., above ISO 200. Although the example described above configuration adjustment module 27 selects a sensitivity setting using motion vectors, similar adjustments may be made using ranges of other indicators of motion, such as luma differences, 1-dimensional projection differences, pixel value differences, histogram differences, or a combination of more than one indicator of motion. For example, configuration adjustment module 27 may adjust the configuration parameters of image sensor 4 as a function of weighted sum of two or more indicators of motion within the scene.

In some aspects, image processor 6 may maintain configuration data 28 that associates indicators of motion with corresponding configuration parameters, e.g., gains and/or exposure times. For example, configuration data 28 may associate magnitudes of motion vectors, luma differences, projection differences, image pixel value differences, and/or histogram differences with particular gains and exposure times. Although illustrated in FIG. 2 as residing within image processor 6, configuration data 28 may be maintained within image storage module 8 to which image processor 6 is coupled. Configuration data 28 may, for example, maintain a plurality of different configuration parameters for the different operating modes of the camera, as well as a data structure that associates magnitudes of the indicators of motion with corresponding gain/exposure time pairs.

In some cases, configuration adjustment module 27 may select initial configuration parameters for image sensor 4 based on brightness, and adjust the configuration parameters of image sensor 4 based on analysis of the motion within the scene of interest. Using gain and exposure time as examples, configuration adjustment module 27 may initially select a smaller gain and a longer exposure time (e.g., corresponding to an ISO 50 setting) when the surrounding environment is bright. Conversely, configuration adjustment module 27 may initially select a larger gain and a shorter exposure time when the surrounding environment is dark (e.g., corresponding to an ISO 200 or higher setting). To this end, configuration data 28 may also include a data structure that associates levels of brightness with corresponding configuration parameters.

The initial gain and exposure time selected by configuration adjustment module 27 may be used by image sensor 4 to capture the two or more preview images used to analyze the motion of the scene of interest. The sensitivity control techniques described above may then be used to adjust the initial gain and exposure time settings of image sensor 4 based on the motion within the scene of interest. In some cases, the setting selected based on the brightness will change based on the motion analysis. In this manner, configuration adjustment module 27 may override the selected configuration parameters based on the motion in the scene of interest. This may result in the introduction of additional noise into the image, but will significantly reduce the blur of the image caused by the motion.

The functionality as described in this disclosure and ascribed to image processor 6 may be performed by one or more programmable processors that execute instructions stored to a computer-readable medium, where the instructions and/or code cause the processor to perform sensitivity selection registration as described in this disclosure. In some cases, the computer-readable medium may form part of a computer program product, which may be sold to manufacturers and/or used in a device.

Figure 3:
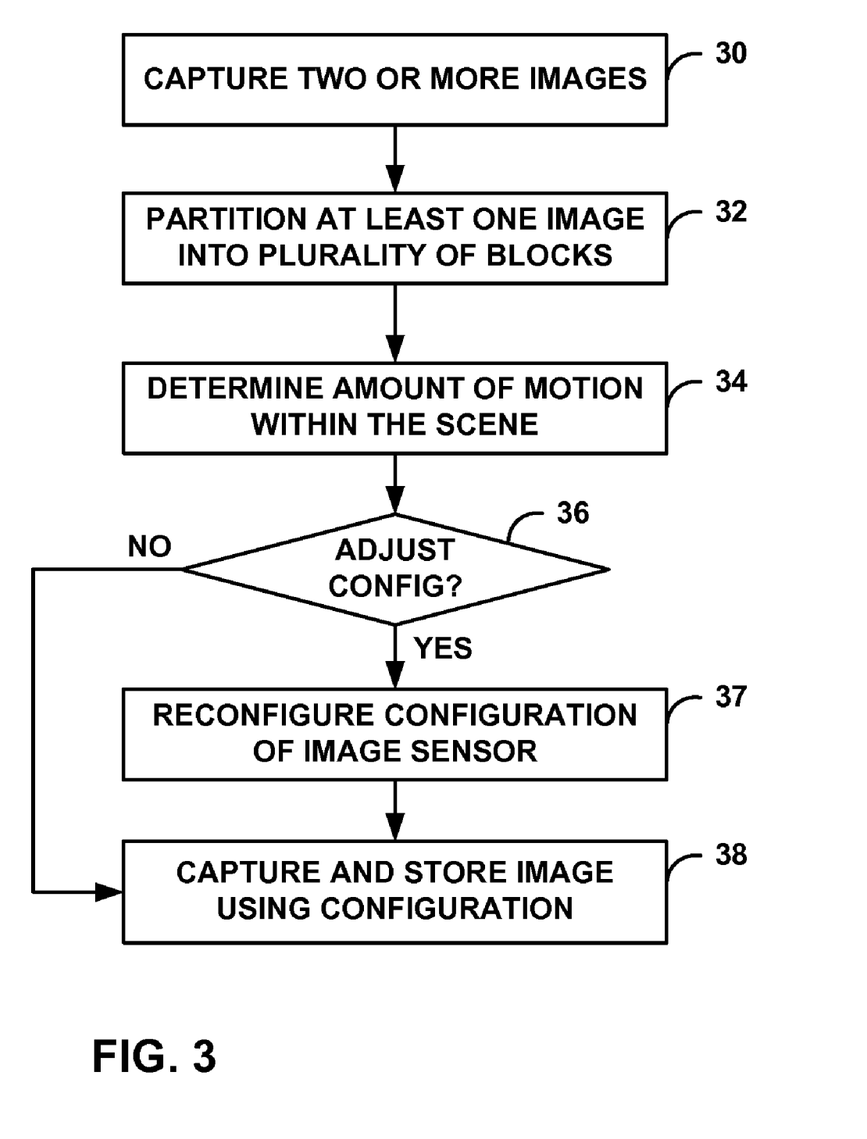
FIG. 3 is a flowchart illustrating example operation of an image capture device performing the image sensor configuration techniques described in this disclosure.

FIG. 3 is a flow diagram illustrating example operation of an image capture device, such as image capture device 2 of FIG. 2, performing the image sensor configuration techniques described in this disclosure. Initially, image sensor 4 of image capture device 2 captures two or more images and stores the images in image buffers 20 (30). As described above, the two or more images may be successive images that are captured by image sensor 4 within milliseconds, or even shorter time periods, from one another. For example, the successive images may be captured during an image preview. Moreover, image sensor 4 may capture the images using initial configuration parameters, e.g., gain and exposure time, selected as a function of the brightness of the scene of interest.

Block partitioner 24 partitions at least one of the images into a plurality of blocks (32). The blocks may be overlapping or non-overlapping, and may be of various dimensions. Motion detection module 26 determines the amount of motion within the scene of interest (34). As described in detail above, motion detection module 26 may determine the amount of motion within the scene of interest using any of a number of indicators, such as motion vectors, differences in luma values between the two images, differences between 1-dimensional projection values of the two images, differences between histograms of the two images or the like.

Configuration adjustment module 27 determines whether to adjust the configuration parameters of image sensor 4 based on the determined amount of motion (36). When initial configuration parameters of the image sensor includes a small gain, configuration adjustment module 27 may determine to adjust the configuration parameters when the scene includes a relatively large amount of motion, e.g., large motion vectors, large sum of differences, large luma differences, large histogram differences, large 1-dimensional projection differences or the like. Conversely, configuration adjustment module 27 may decrease or maintain the current gain of image sensor 4 for scenes that include relatively small amount of motion or no motion at all within the scene of interest.

When configuration adjustment module 27 determines that an adjustment to the configuration parameters of image sensor 4 is desired, configuration adjustment module 27 reconfigures the configuration of image sensor 4 (37). Configuration adjustment module 27 may, for example, reconfigure the sensor gain of image sensor 4, an exposure time of image sensor 4 or a combination thereof. After reconfiguring the sensitivity of image sensor 4 or when the sensitivity of image sensor 4 does not need to be reconfigured, image sensor 4 captures and stores the image of the scene of interest using the configured settings upon actuation of a button by a user (38). In this manner, image capture device configures image sensor 4 as a function of the motion within the scene of interest. Although discussed herein as adjusting a gain and/or exposure times of image sensor 4 for purposes of illustration, configuration adjustment module 27 may adjust other configuration parameters of image sensor 4.

Figure 4:
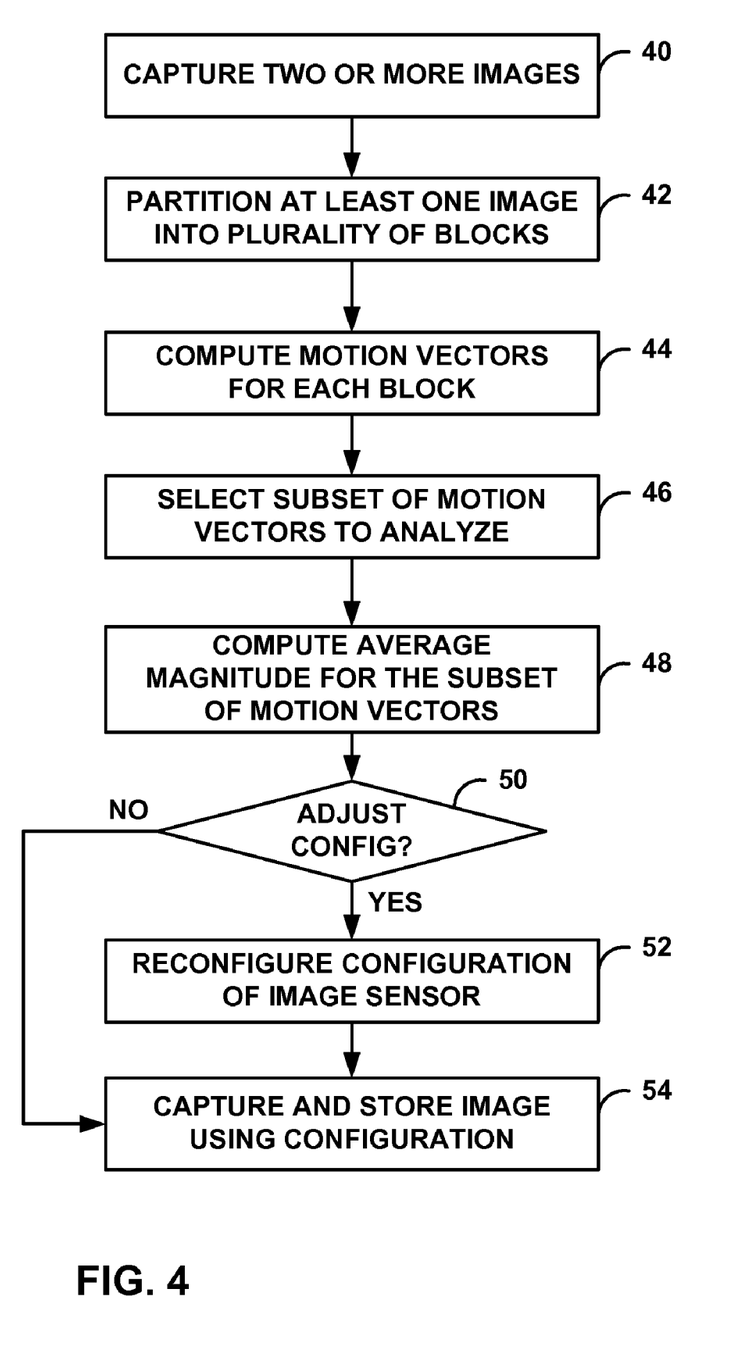
FIG. 4 is a flow diagram illustrating example operation of an image capture device performing the image sensor configuration techniques using motion vectors.

FIG. 4 is a flow diagram illustrating example operation of an image capture device, such as image capture device 2 of FIG. 2, performing the image sensor configuration techniques based on at least a portion of the motion vectors associated with the image. Initially, image sensor 4 of image capture device 2 captures two or more images and stores the images in image buffers 20 (40). As described above, the two or more images may be successive images that are captured by image sensor 4 within milliseconds, or even shorter time periods, from one another. For example, the successive images may be captured during an image preview. Moreover, image sensor 4 may capture the images using an initial configuration parameters, e.g., gain and exposure time, selected as a function of the brightness of the scene of interest.

Block partitioner 24 partitions at least one of the images into a plurality of blocks (42). The blocks may be overlapping or non-overlapping, and may be of various dimensions. Motion detection module 26 computes motion vectors for each of the blocks of the image (44). Motion detection module 26 selects a subset of the motion vectors to analyze (46). As described above, motion detection module 26 may select a subset that includes the largest motion vectors of the image. For example, motion detection module 26 may select the largest 10% of the motion vectors of the blocks as the subset of motion vectors to be analyzed. In some aspects, however, motion detection module 26 may analyze the entire set of motion vectors for an image instead of only a subset. Motion detection module 26 computes an average magnitude for the subset of motion vectors (48). The average magnitude may, for example, represent a moving object within the scene of interest.

Configuration adjustment module 27 determines whether to adjust the configuration parameters of image sensor 4 based on the average magnitude computed for the subset of motion vectors (50). In some aspects, configuration adjustment module 27 may maintain configuration data 28 that associates motion vector magnitudes with corresponding configuration parameters (e.g., ISO gains and/or exposure times). For example, configuration adjustment module 27 may select an ISO 50 setting when an average motion vector magnitude, e.g., of the largest motion vectors, is less than approximately 1% of a width of the image. Configuration adjustment module 27 may select ISO 100 when the average motion vector magnitude is between approximately 1% and 10% of the width of the image. Configuration adjustment module 27 may select ISO 200 when the average motion vector magnitude is between approximately 10% and 20% of the width of the image. Other thresholds may be used to associate the magnitude of the motion vector with particular sensitivity settings.

When configuration adjustment module 27 determines that an adjustment to the configuration parameters of image sensor 4 is desired, configuration adjustment module 27 reconfigures the configuration of image sensor 4 (52). Configuration adjustment module 27 may, for example, reconfigure the sensor gain of image sensor 4, an exposure time of image sensor 4 or a combination thereof. After reconfiguring the sensitivity of image sensor 4 or when the sensitivity of image sensor 4 does not need to be reconfigured, image sensor 4 captures and stores the image of the scene of interest using the configured settings upon actuation of a button by a user (54). In this manner, image capture device configures image sensor 4 as a function of the motion within the scene of interest. Similar adjustment techniques may be utilized using other indicators of motion, as described in detail with respect to FIG. 2.

Figure 5:
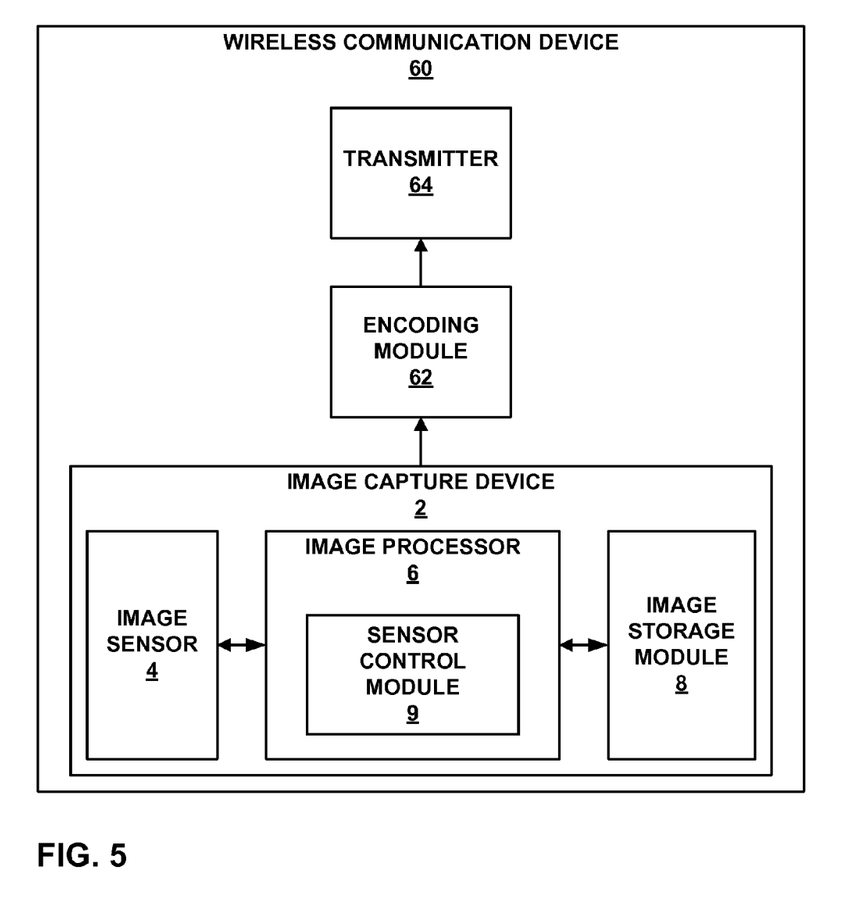
FIG. 5 is a block diagram of a wireless communication device that incorporates the image capture device of FIG. 1.

FIG. 5 is a block diagram illustrating an example wireless communication device 60 that includes an image capture device 2 that implements the image capture techniques described in this disclosure. In other words, FIG. 5 shows image capture device 2 integrated within a wireless communication device. Operation of image capture device 2 is described above with respect to FIG. 1 and therefore will not be described in detail here. Wireless communication device 60 may comprise a wireless communication device handset, such as a cellular phone having image capturing capabilities (e.g., the so-called camera phone or video phone), a video recorder, a personal digital assistant (PDA), a laptop computer or any other handheld device having image capturing and wireless communication capabilities. Although illustrated in the context of a wireless communication device, the techniques of this disclosure may be applicable to wired communication devices.

In the example of FIG. 5, wireless communication device 60 includes image capture device 2, an encoding module 62 and a transmitter 64. Encoding module 62 may encode the captured image information to compress the image into a particular image compression format for storage and/or transmission. Encoding module 62 may compress the image using any of a number of image compression formats, including JPEG, TIFF, GIF or other image compression format. In the case of video, encoding module 62 may compress the video using any number of video compression formats, such as MPEG, MPEG Advanced Video Coding (AVC) part 10, ITU H.264 and the like.

Wireless communication device 60 may transmit the encoded image to another device via transmitter 64. Transmitter 64 typically provides an interface to a cellular network, such as a code division multiple access (CDMA) network, a wideband code division multiple access (W-CDMA) network, a time division multiple access (TDMA) network, and a global system for mobile communication (GSM) network, or other similar network. Transmitter 64, in addition or as alternate to the cellular network, may provide an interface to a wireless network as defined by any of the relevant Institute of Electrical and Electronics Engineers (IEEE) 802.11 standards, or any other wired or wireless network. Although described as including only image capture device 2, encoding module 62 and transmitter 64, wireless communication device 60 may include other modules, such as a display, a user interface (e.g., a keypad) for interfacing with a user, one or more processors for performing additional operations, and various ports and receptacles for accepting removable memory, headphones, power supplies, and any other such peripherals.

The techniques described in this disclosure may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more DSPs, general purpose microprocessors, ASICs, FPGAs, FPLAs, or other equivalent integrated or discrete logic circuitry. Accordingly, the term "processor," as used in this disclosure may refer to any of the foregoing structure or any other structure suitable for implementation of the techniques described in this disclosure. In addition, in some aspects, the functionality described in this disclosure may be provided within dedicated software modules or hardware modules configured for encoding and decoding, or incorporated in a combined video CODEC. Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Various techniques have been described. These and other example aspects are within the scope of the following claims.

The invention claimed is:

1. A method for capturing digital image data using an electronic device having a memory, the method comprising:
analyzing motion between at least a first image of a scene of interest and a second image of the scene of interest by computing average luminance values for one or more blocks of pixels of the first and second images;
computing a plurality of differences between the average luminance values of the blocks of pixels of the first image and the average luminance values of corresponding blocks of pixels of the second image;
determining an amount of global motion of the scene of interest based on the plurality of differences;
adjusting one or more configuration parameters used by an image sensor to capture images based on the determined amount of global motion; and storing the one or more adjusted configuration parameters in the memory of the electronic device.

2. The method of claim 1, wherein adjusting one or more configuration parameters used by the image sensor to capture images comprises adjusting at least one of a gain of the image sensor and an exposure time during which the image sensor is exposed to the scene of interest.

3. The method of claim 1, wherein adjusting one or more configuration parameters used by the image sensor to capture images comprises one of increasing a gain of the image sensor when the motion between the first and second images exceeds a threshold and decreasing the gain of the image sensor when the motion between the first and second images is less than a threshold.

4. The method of claim 1, wherein analyzing motion between at least a first image of a scene of interest and a second image of the scene of interest comprises analyzing the motion based on the differences in the average luminance values.

5. The method of claim 1, wherein analyzing motion between at least a first image of a scene of interest and a second image of the scene of interest comprises:
   computing 1-dimensional horizontal projection values and 1-dimensional vertical projection values for one or more blocks of pixels of the first and second images;
   computing a difference between the horizontal and vertical projection values of the one or more blocks of pixels of the first image and the horizontal and vertical projection values of corresponding blocks of pixels of the second image; and
   analyzing the motion based on the differences in horizontal and vertical projections.

6. The method of claim 1, wherein analyzing motion between at least a first image of a scene of interest and a second image of the scene of interest comprises:
   computing, for each of the first and second images, a histogram that represents the distribution of pixel values over the respective image;
   computing a difference between the histogram of the first image and the histogram of the second image; and
   analyzing the motion based on the differences between the histograms.

7. The method of claim 1, wherein analyzing motion between at least a first image of a scene of interest and a second image of the scene of interest comprises:
   subtracting pixel values for at least a portion of pixels of the first frame from pixel values of corresponding pixels of the second frame to compute pixel value differences;
   summing the pixel value differences; and
   analyzing the motion based on the sum of the pixel value differences.

8. The method of claim 1, wherein the plurality of differences include differences between the average luminance values of all blocks of pixels of the first image and the average luminance values of all corresponding blocks of pixels of the second image.

9. The method of claim 1, wherein the plurality of differences include differences between the average luminance values of a subset of blocks of pixels of the first image and the average luminance values of a subset of corresponding blocks of pixels of the second image.

10. The method of claim 1, wherein determining an amount of global motion of the scene of interest includes calculating a sum of absolute differences of the plurality of differences.

11. A device for capturing digital image data comprising:
   an image sensor configured to capture images in accordance with one or more configuration parameters; and
   an image processor configured to analyze motion between at least a first image of a scene of interest and a second image of the scene of interest by computing average luminance values for one or more blocks of pixels of the first and second images, compute a plurality of differences between the average luminance values of the blocks of pixels of the first image and the average luminance values of corresponding blocks of pixels of the second image, determine an amount of global motion of the scene of interest based on the plurality of differences, and adjust one or more of the configuration parameters used by the image sensor to capture images based on the determined amount of global motion.

12. The device of claim 11, wherein the image processor is configured to adjust at least one of a gain of the image sensor and an exposure time during which the image sensor is exposed to the scene of interest.

13. The device of claim 11, wherein the image processor is further configured to analyze the motion based on the differences in the average luminance values.

14. The device of claim 11, wherein the image processor is configured to compute 1-dimensional horizontal projection values and 1-dimensional vertical projection values for one or more blocks of pixels of the first and second images, compute a difference between the horizontal and vertical projection values of the one or more blocks of pixels of the first image and the horizontal and vertical projection values of corresponding blocks of pixels of the second image and analyze the motion based on the differences in horizontal and vertical projections.

15. The device of claim 11, wherein the image processor is configured to compute, for each of the first and second images, a histogram that represents the distribution of pixel values over the respective image, compute a difference between the histogram of the first image and the histogram of the second image and analyze the motion based on the differences between the histograms.

16. The device of claim 11, wherein the image processor is configured to subtract pixel values for at least a portion of pixels of the first frame from pixel values of corresponding pixels of the second frame to compute pixel value differences, sum the pixel value differences and analyze the motion based on the sum of the pixel value differences.

17. The device of claim 11, wherein the device comprises a wireless communication device, the wireless communication device further comprising:
   an encoding module configured to encode the captured image; and
   a transmitter configured to transmit the encoded image.

18. The device of claim 11, wherein the plurality of differences include differences between the average luminance values of all blocks of pixels of the first image and the average luminance values of all corresponding blocks of pixels of the second image.

19. The device of claim 11, wherein the plurality of differences include differences between the average luminance values of a subset of blocks of pixels of the first image and the average luminance values of a subset of corresponding blocks of pixels of the second image.

20. The device of claim 11, wherein determining an amount of global motion of the scene of interest includes calculating a sum of absolute differences of the plurality of differences.

21. A non-transitory computer-program product for capturing digital image data comprising a computer readable medium having instructions thereon, the instructions comprising:

code for analyzing motion between at least a first image of a scene of interest and a second image of the scene of interest;

code for computing average luminance values for one or more blocks of pixels of the first and second images;

code for computing a plurality of differences between the average luminance values of the one or more blocks of pixels of the first image and the average luminance values of corresponding blocks of pixels of the second image;

code for determining an amount of global motion of the scene of interest based on the plurality of differences; and code for adjusting one or more configuration parameters used by an image sensor to capture images based on the determined amount of global motion.

22. The non-transitory computer-program product of claim 21, wherein code for adjusting one or more configuration parameters used by the image sensor to capture images comprises code for adjusting at least one of a gain of the image sensor and an exposure time during which the image sensor is exposed to the scene of interest.

23. The non-transitory computer-program product of claim 21, wherein code for analyzing motion between at least a first image of a scene of interest and a second image of the scene of interest comprises code for analyzing the motion based on the differences in the average luminance values.

24. The non-transitory computer-program product of claim 21, wherein code for analyzing motion between at least a first image of a scene of interest and a second image of the scene of interest comprises:

code for computing 1-dimensional horizontal projection values and 1-dimensional vertical projection values for one or more blocks of pixels of the first and second images;

code for computing a difference between the horizontal and vertical projection values of the one or more blocks of pixels of the first image and the horizontal and vertical projection values of corresponding blocks of pixels of the second image; and code for analyzing the motion based on the differences in horizontal and vertical projections.

25. The non-transitory computer-program product of claim 21, wherein code for analyzing motion between at least a first image of a scene of interest and a second image of the scene of interest comprises:

code for computing, for each of the first and second images, a histogram that represents the distribution of pixel values over the respective image;

code for computing a difference between the histogram of the first image and the histogram of the second image; and code for analyzing the motion based on the differences between the histograms.

26. The non-transitory computer-program product of claim 21, wherein code for analyzing motion between at least a first image of a scene of interest and a second image of the scene of interest comprises:

code for subtracting pixel values for at least a portion of pixels of the first frame from pixel values of corresponding pixels of the second frame to compute pixel value differences;

code for summing the pixel value differences; and code for analyzing the motion based on the sum of the pixel value differences.

27. The non-transitory computer-program product of claim 21, wherein the plurality of differences include differences between the average luminance values of all blocks of pixels of the first image and the average luminance values of all corresponding blocks of pixels of the second image.

28. The non-transitory computer-program product of claim 21, wherein the plurality of differences include differences between the average luminance values of a subset of blocks of pixels of the first image and the average luminance values of a subset of corresponding blocks of pixels of the second image.

29. The non-transitory computer-program product of claim 21, wherein code for determining an amount of global motion of the scene of interest includes calculating a sum of absolute differences of the plurality of differences.

30. An apparatus for capturing digital image data comprising:

means for analyzing motion between at least a first image of a scene of interest and a second image of the scene of interest;

means for computing average luminance values for one or more blocks of pixels of the first and second images;

means for computing a plurality of differences between the average luminance values of the one or more blocks of pixels of the first image and the average luminance values of corresponding blocks of pixels of the second image;

means for determining an amount of global motion of the scene of interest based on the plurality of differences;

means for adjusting one or more configuration parameters used by an image sensor to capture images based on the determined amount of global motion.

31. The apparatus of claim 30, further comprising:

means for determining initial configuration parameters used by the image sensor to capture images based on a brightness of the scene of interest.

32. The apparatus of claim 30, wherein the apparatus comprises a wireless telephone.

33. The apparatus of claim 30, wherein the plurality of differences include differences between the average luminance values of all blocks of pixels of the first image and the average luminance values of all corresponding blocks of pixels of the second image.

34. The apparatus of claim 30, wherein the plurality of differences include differences between the average luminance values of a subset of blocks of pixels of the first image and the average luminance values of a subset of corresponding blocks of pixels of the second image.

35. The apparatus of claim 30, wherein the means for determining an amount of global motion of the scene of interest includes means for calculating a sum of absolute differences of the plurality of differences.

* * * * *